3,127,039
DEVICE FOR INVERTING CONTAINERS TO
EMPTY CONTENTS THEREOF
Milton J. Christiansen, deceased, late of Brookfield, Ill., by Blanche E. Christiansen, executrix, Brookfield, Ill., assignor to Western Electric Company, Incorporated, New York, N.Y., a corporation of New York
Filed Apr. 16, 1962, Ser. No. 189,225
2 Claims. (Cl. 214—313)

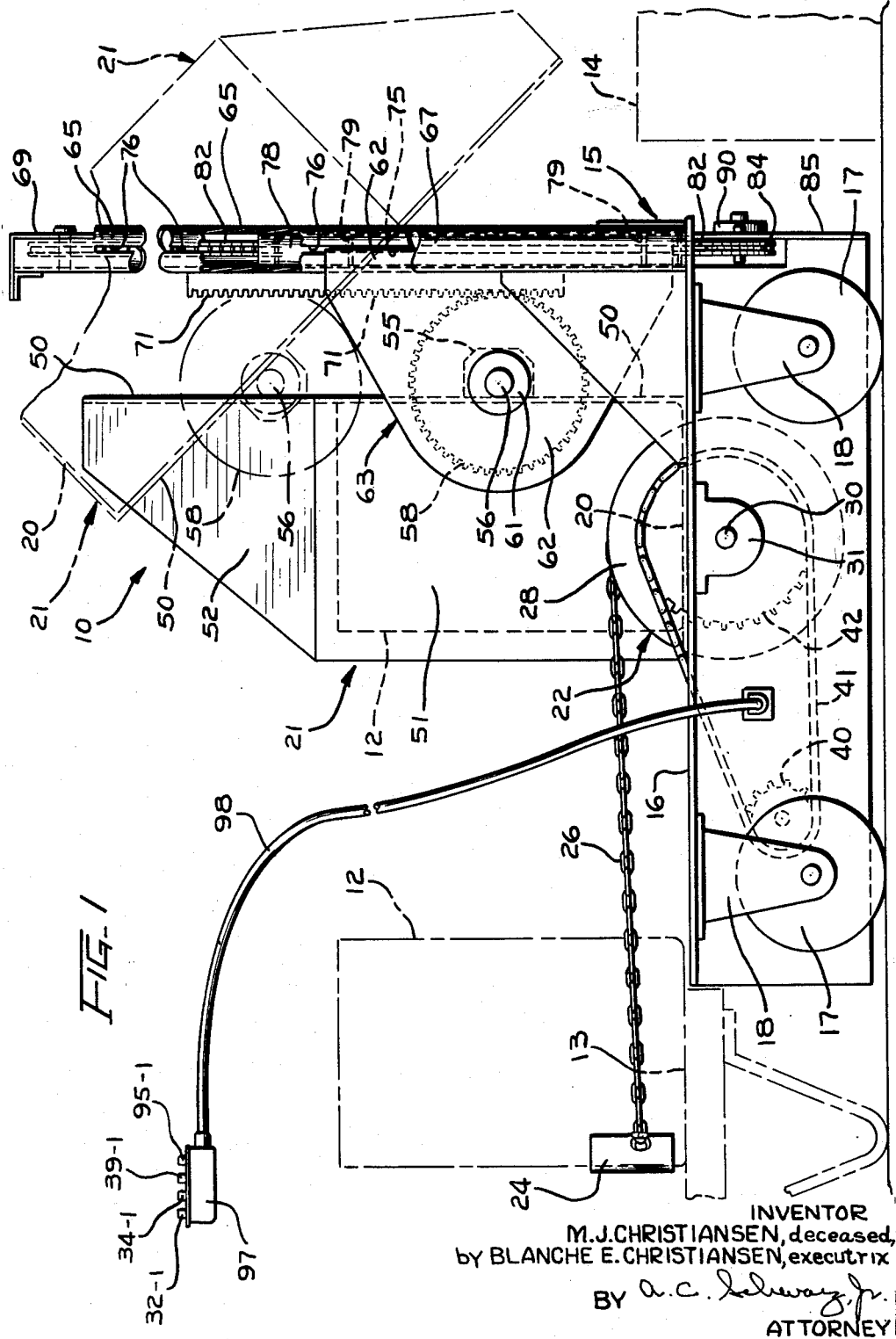

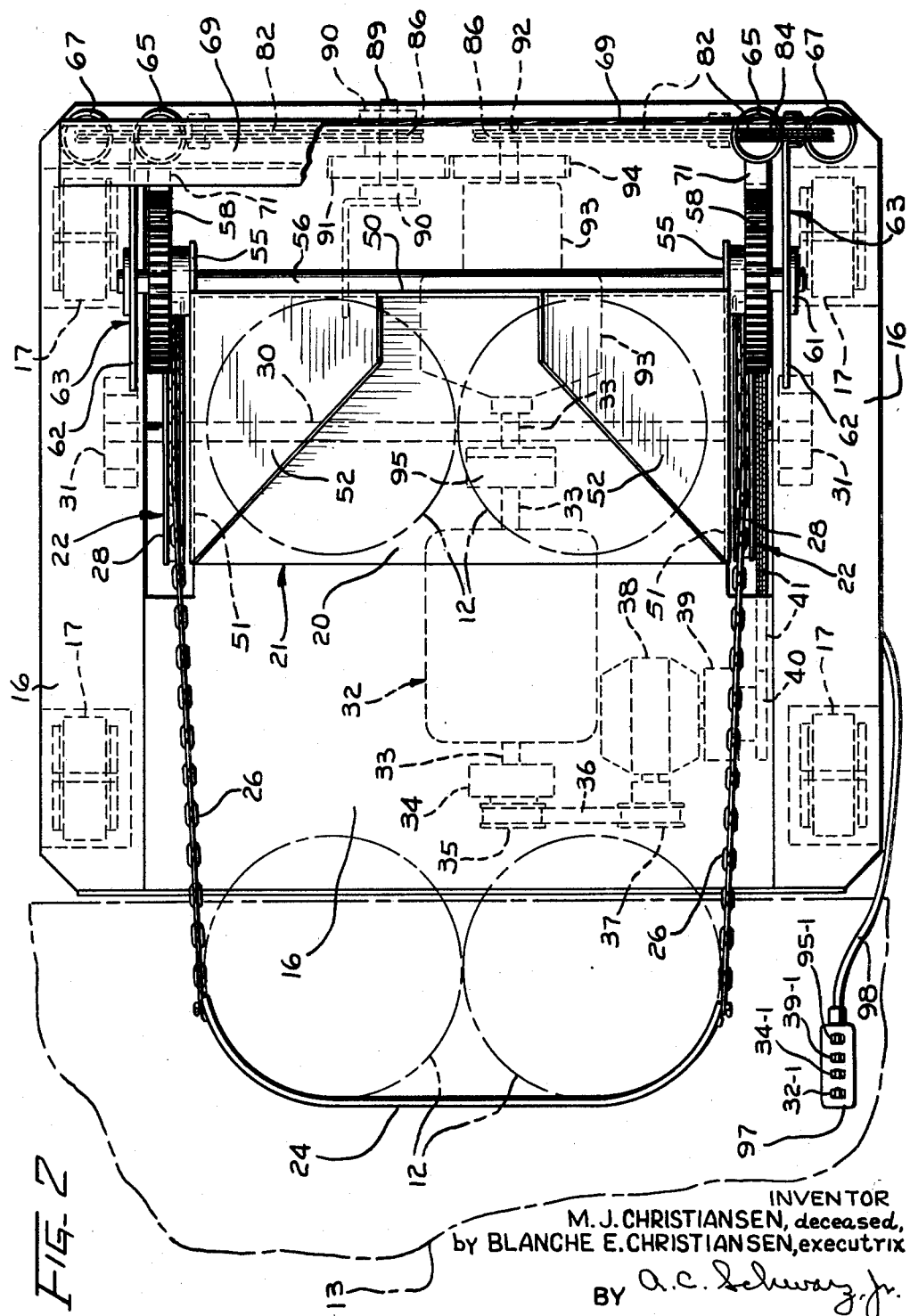

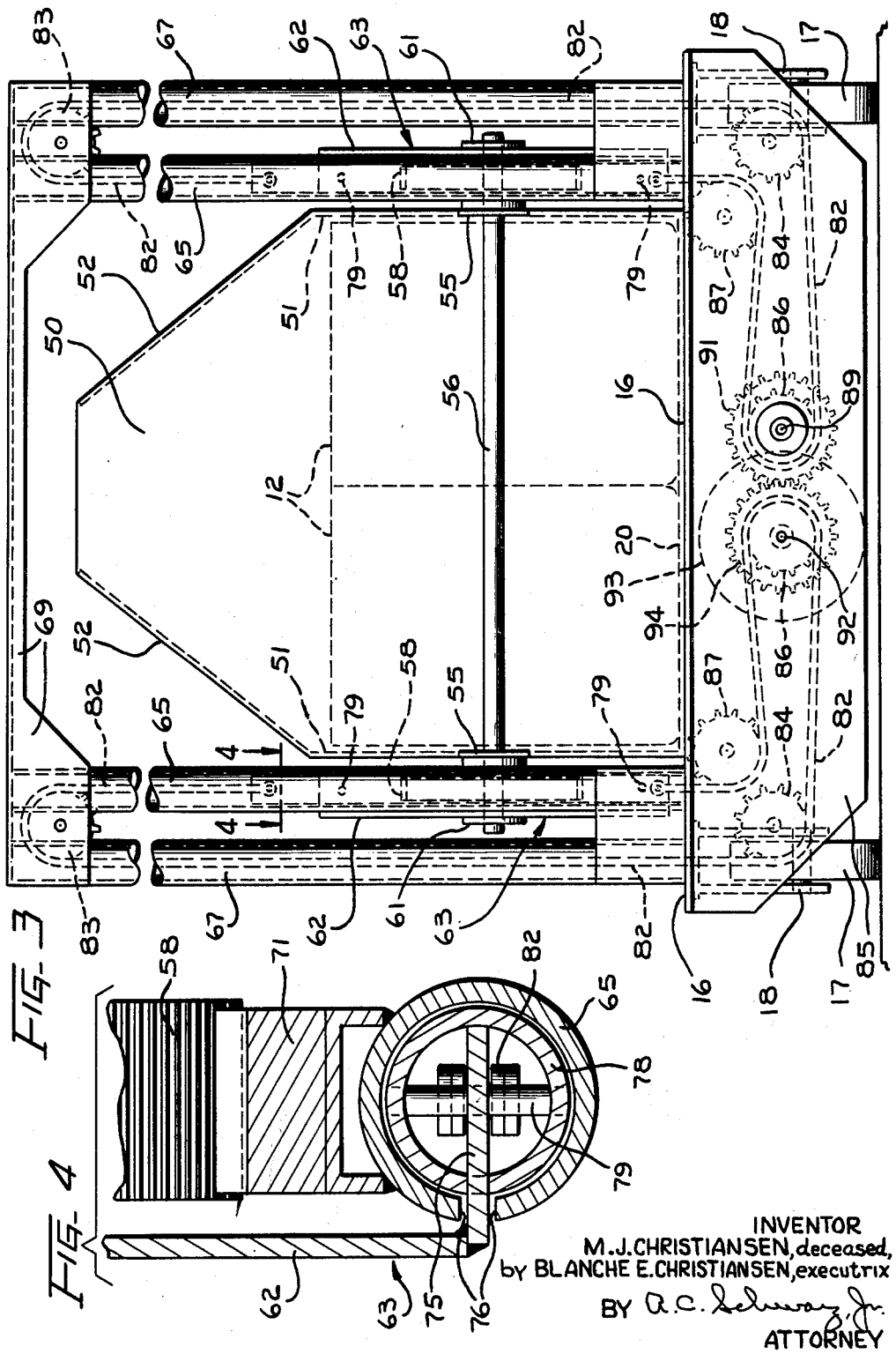

This invention relates to a device for inverting containers to empty the contents thereof, and more particularly to a device for moving relatively heavy kegs of piece parts from skids and selectively tipping the kegs to empty the contents thereof.

In the fabrication of composite metal articles from piece parts it frequently happens that relatively large quantities of the piece parts are placed in containers in the form of kegs, etc. These kegs containing a supply of the metal piece parts although not very large in size are frequently relatively heavy and are difficult for one person to lift and invert. In many cases it requires the efforts of two people to lift and tip the keg to empty the contents thereof.

An object of the invention is to provide an improved device for inverting containers to empty the contents thereof.

Another object of the invention is to provide an improved apparatus for moving a relatively heavy container of piece parts from a support and selectively tipping the container to various positions to empty the contents thereof.

A device illustrating certain aspects of the invention may include a platform supported on wheels at an elevation level with the upper surface of a skid on which relatively heavy kegs of piece parts are supported. A flexible metal band is connected at opposite ends thereof to a pair of chains that are wound on power operated take-up drums on the device so that when the band is placed around a pair of the kegs on the skid, the take-up drums can be actuated to effect the transfer of the kegs from the skid onto the platform and onto the bottom wall of a cradle supported on the platform of the device.

The cradle is secured to a horizontal shaft, the ends of which project beyond the cradle and are journalled in an elevator carriage that is mounted for vertical movement on upright guides on the platform. Gears on the shaft mesh with stationary racks on the guides, and chains connected to the upper and lower portions of the elevator carriage are connected to a power drive for effecting the raising and lowering of the elevator carriage under control of a manually operable switch. As the cradle is carried upwardly with the elevator carriage, the gears are rotated by the racks and impart a turning movement to the cradle and the kegs of parts to an inverted position to empty some or all of the parts from the keg into a receptacle therefor, the upper portion of the cradle being so shaped to form a spout for retaining the kegs and directing the flow of piece parts from the cradle.

Other objects, advantages and novel aspects of the invention will become apparent upon consideration of the following detailed description, in conjunction with the accompanying drawings, in which:

FIG. 1 is a side view of the device embodying the present invention and showing in dotted lines a pair of kegs being transferred from a skid to the device;

FIG. 2 is a plan view of the device;

FIG. 3 is an end view of the device; and

FIG. 4 is an enlarged fragmentary plan sectional view of the device taken on line 4—4 of FIG. 3.

Referring to the drawings, the present device 10 is designed to remove one or a pair of containers or kegs 12 of piece parts from a skid 13 or other support and invert the kegs to empty the contents thereof, all or a portion of it at a time, and to direct the piece parts into a receptacle 14 (FIG. 1). The device includes a truck 15 comprising a horizontal frame plate or platform 16 supported by a plurality of wheels 17 and brackets 18 at the level of the upper surface of the skid 13.

The kegs 12 are adapted to be transferred from the skid 14 onto the platform 16 of the truck and onto the bottom wall 20 of a cradle or carrier 21 by a power operated winch mechanism 22 including a flexible metal band 24. This band is adapted to fit partly around a pair of the containers 12 and the ends of the band 24 are secured to the ends of a pair of chains 26, the other ends of which are secured to a pair of take-up drums 28 for winding up the chain and imparting movement to the band 24. The take-up drums 28 are secured to a shaft 30 supported in a pair of bearings 31 mounted on the underside of the platform 16. Rotation is imparted to the shaft 30 and the drums 28 by a reversible motor 32 secured to the underside of the platform 16.

To one end of the shaft 33 of the motor 32 is secured a magnetic clutch 34 (FIG. 2), the releasable element of which is secured to a pulley 35. This pulley is operatively connected through a belt 36 and a pulley 37 to the input shaft of a speed reducing unit 38 secured to the underneath side of the platform. The output shaft of the speed reducing unit is secured to a magnetic clutch 39, the releasable element of which is connected to a sprocket 40. Through a chain 41 the sprocket 40 drives a sprocket 42 fixedly secured to the shaft 30.

The cradle 21 comprises a scoop-like shell having a back wall 50 and a pair of side walls 51 which extend upwardly from the bottom wall 20 to support the kegs 12 as they are being inverted and which provide a side opening for horizontal movement of the kegs into the cradle and onto the bottom wall 20 thereof. The upper portion 52 of the side walls 51 converge towards each other and cooperate with the back wall 50 to form a spout for directing the piece parts as they are discharged from the kegs and the cradle. Apertured portions 55 of the side walls 51 extend laterally beyond the back wall 50 for receiving a shaft 56 therethrough adjacent to the back wall 50 and in spaced relation to the upper and lower extremities of the cradle 21. A pair of gears 58 are fixedly secured to the shaft 56 and to the cradle 21 for rotation therewith and the ends of the shaft 56 are journalled in bearings 61 on vertical plates or brackets 62 of an elevator carriage 63.

The elevator carriage 63 is guided for vertical movement in a pair of vertically disposed slotted tubular guides 65 secured at their lower ends to the platform 16 in laterally spaced relation to each other to permit turning movement of the cradle 51 therebetween. Also mounted on the platform 16 adjacent and parallel to the tubular guides 65 is a pair of tubular members 67 (FIG. 3). At their upper ends the tubular guides 65 and members 67 are interconnected by a transverse frame member 69. The gears 58 on the cradle 21 mesh with the teeth of vertically disposed rack bars 71 fixedly secured to the tubular guides 65.

As shown particularly in FIG. 4, the vertical plates 62 of the elevator carriage 63 have laterally directed flanges 75 which pass through longitudinal clearance slots 76 in the tubular guides 65 and into slotted tubular elements 78 to which they are suitably secured as by keys 79. The tubular elements 78 are slidable within the tubular guides 65 and guide the carriage 63 for vertical movement. At the upper end of each of the flanges 75 of the plates 62 of the elevator carriage one end of a chain 82 is secured (FIG. 3). The chain 82 extends upwardly from the flange 75 (FIG. 4) within the tubular guide 65, around an idler sprocket 83 on the cross frame member 69, downwardly through the tubular member 67 and around an idler sprocket 84 on a frame plate 85 which extends downwardly from the platform 16. The chain continues horizontally from the idler sprocket 84, around a drive sprocket 86 and around an idler sprocket 87, then upwardly through the tubular guide member 65 with the other end of the chain secured to the lower portion of the flange 75 of the elevator carriage.

One of the drive sprockets 86 is fixedly secured to a shaft 89 which is journalled in bearings 90 and has a spur gear 91 secured thereto. The other drive sprocket 86 is secured to an output shaft 92 of a speed reducer 93 and has a gear 94 fixed thereto which meshes with and drives the spur gear 91. The speed reducer 93 is secured to the underneath side of the platform 16 and the input shaft thereof is connected to the releasable element of a magnetic clutch 95 which is secured to the other end of the motor shaft 33.

The motor 32 and the magnetic clutches 34, 39 and 95 are connected to a source of power through switches 32–1, 34–1, 39–1 and 95–1, respectively, which are mounted on a portable switch box 97 (FIG. 1) at the end of an elongated cable 98 to provide a remote control for the motor and the clutches.

In the operation of the device, with the cradle 21 in its normal lower position, as shown in FIG. 1, the device 10 is moved to bring the forward end of the platform 16 into abutting engagement with the skid 13 from which a pair of containers 12 are to be removed and inverted to empty the contents thereof. With the device 10 properly positioned, the operator engages the band 24 and places it around a pair of the kegs 12 on the skid 13. It will be understood that the magnetic clutch 39 is deenergized, thus providing for free movement of the chains 26 and the band 24. With the band properly positioned around the kegs, the operator manipulates the switch 32–1 to effect the rotation of the motor 32 in one direction and thereafter the operator closes the switches 34–1 and 39–1 to effect the energization of the clutches 34 and 39 and the rotation of the take-up drums 28 to wind up the chains 26 and move the band 24 and the kegs 12 from the skid 13 onto the platform 16 and onto the bottom wall 29 of the cradle 21. The switches 39–1 and 34–1 are then opened to effect the deenergization of the magnetic clutches 39 and 34.

If it is necessary to empty the contents of the keys 12 at a remote location, the device 10 is moved to such location. With the motor 32 running in the same direction, the operator then closes the switch 95–1 to effect the energization of the magnetic clutch 95 and the movement of the elevator carriage 63 upwardly in response to which the cradle 21 is moved upwardly therewith and rotated about the axis of the shaft 56 as the gear wheels 58 travel up the rack bars 71. The cradle 21 and the kegs 12 of piece parts therein will be progressively rotated about the shaft 56 to and beyond a horizontal position to tip the spout 53 of the container downwardly at a progressively changing angle, during which the piece parts are discharged from the kegs onto the cradle and directed therefrom through the spout into the receptacle 14 provided therefor.

By manipulating the switch 95–1, the operator controls the energization and deenergization of the magnetic clutch 95 to effect the stopping of the cradle in progressively advanced positions and in this manner controls the rate and the amount of discharge of the parts from the kegs 12. On completion of the emptying of the contents of the kegs 12, the cradle 21 is overhanging the shaft 56 on the opposite side thereof from the normal position of the cradle and is held by gravity in such position. To return the elevator carriage 63 to its normal starting position on the platform 16 the switch 32–1 is operated to reverse the rotation of the motor 32 after which the switch 95–1 is operated to energize the magnetic clutch 95 and connect the drive to the elevator carriage 63.

As the cradle 21 is returned to its normal position on the platform 16, the switches 95–1 and 32–1 are operated to deenergize the clutch 95 and to stop the motor 32. Thereafter the empty kegs 12 are removed from the cradle.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for elevating and tilting containers which comprises a horizontal platform, roller means for supporting said platform, a pair of vertically disposed longitudinally slotted tubular guides fixedly supported on said platform, a vertically disposed tubular member for each of said tubular guides fixedly mounted on said platform in parallel and adjacent relation to said tubular guides, a transverse frame member interconnecting said tubular members and said tubular guides at the upper ends thereof, an elevator element slidably mounted within each of said tubular guides, elevator brackets extending laterally from said elevator elements for vertical movement therewith on said tubular guides, a chain secured to each of said elevator elements with portions of the chain directed therefrom in opposite directions, means for guiding portions of the chains vertically within said tubular guides and said tubular members, reversible drive means for actuating said chains to effect the raising and lowering of the elevator elements, a cradle for supporting a container, said cradle having a bottom normally resting on said platform for supporting the container thereon in upright position and having walls extending upwardly from said bottom for supporting the container for turning movement and providing a side opening for horizontal movement of the container into said cradle, said upwardly extending walls being shaped to retain the container on the cradle in inverted position and to form a spout for directing the contents of the container from said cradle, means for connecting said cradle to said elevator brackets for vertical movement therewith and for rotation relative thereto about a horizontal axis, a gear fixedly connected to said cradle in concentric relation to said axis, a vertically disposed rack bar meshing with said gear and mounted in fixed relation to said platform, and means for selectively actuating said reversible drive means.

2. A device for elevating and inverting containers which comprises a horizontal platform, roller means for supporting said platform for horizontal movement, a pair of vertically disposed longitudinally slotted tubular guides fixedly supported on said platform in laterally spaced relation to each other, a vertically disposed tubular member for each of said tubular guides fixedly mounted on said platform in parallel and adjacent relation to said tubular guides, a transverse frame member interconnecting said tubular members and said tubular guides at the upper ends thereof, an element slidably mounted within each of said tubular guides, elevator brackets secured to said elements and through the slotted tubular guides for vertical movement therewith, a horizontally disposed shaft journalled in said elevator brackets, a pair of gears fixedly secured to said shaft, vertically disposed stationary rack bars mounted on said slotted tubular guides in meshing engagement with said gears, a cradle fixedly secured to said shaft for vertical and rotary movement therewith to and from a normal position in engagement with said platform and provided with a side opening for the horizontal movement of the container along the platform and into the cradle, said cradle having a bottom wall normally resting on said platform for supporting the container thereon in upright position and having wall portions extending upwardly from said bottom wall for supporting the container for rotary movement with said shaft, said upwardly directed wall portions being shaped to retain the container when said cradle is in inverted position and to form a spout for directing the contents of the container from the cradle, a chain for each of said elements, the ends of said chains being secured to said elements, means for guiding said chains for movement vertically within said tubular guides and said tubular members, reversible drive means including a motor mounted on the underside of said platform for acutating said chains to effect the raising and lowering of the elevator brackets and the vertical and rotary movement of the cradle and the container thereon, and means for selectively actuating said drive means to effect the rotation of the cradle and the tilting of the container to various oblique positions.

References Cited in the file of this patent

UNITED STATES PATENTS

| | | |
|---|---|---|
| 1,763,560 | Amendolara | June 10, 1930 |
| 2,120,042 | Remde | June 7, 1938 |
| 2,670,864 | Hought | Mar. 2, 1954 |
| 2,671,571 | Gerhardt | Mar. 9, 1954 |
| 2,756,883 | Schreck | July 31, 1956 |
| 2,872,058 | Doepke | Feb. 3, 1959 |
| 2,908,410 | Glanz | Oct. 13, 1959 |
| 2,921,700 | Reed | Jan. 19, 1960 |
| 3,040,919 | Nolan | June 26, 1962 |